(No Model.)  3 Sheets—Sheet 1.
W. FALCONER.
MACHINE FOR THE MANUFACTURE OF CARBON BLACK.
No. 277,472.  Patented May 15, 1883.
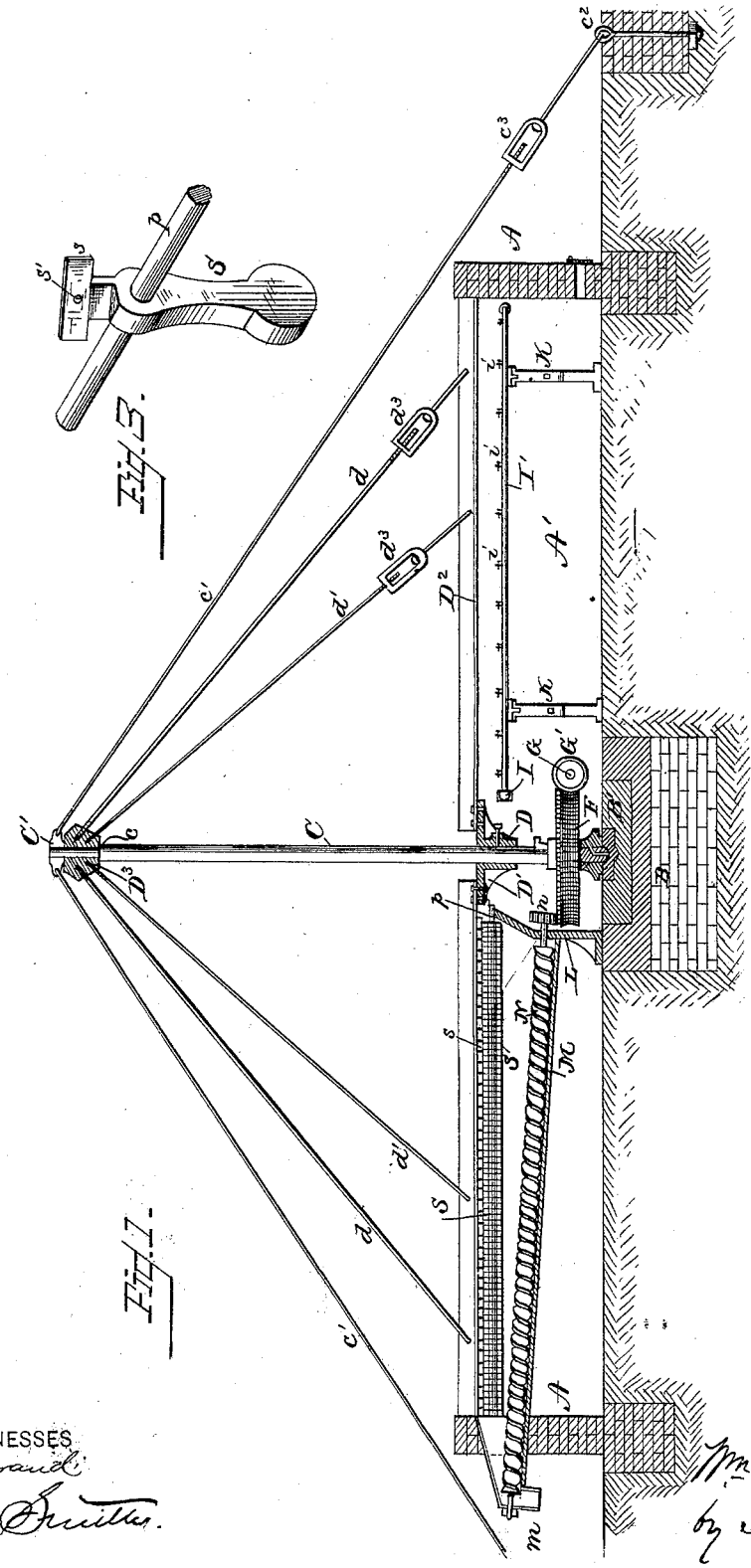
WITNESSES
F. L. Durand
Rex Smith
INVENTOR
Wm Falconer
by A. M. Smith
ATTORNEY (No Model.) 3 Sheets—Sheet 2.
W. FALCONER.
MACHINE FOR THE MANUFACTURE OF CARBON BLACK.
No. 277,472. Patented May 15, 1883.
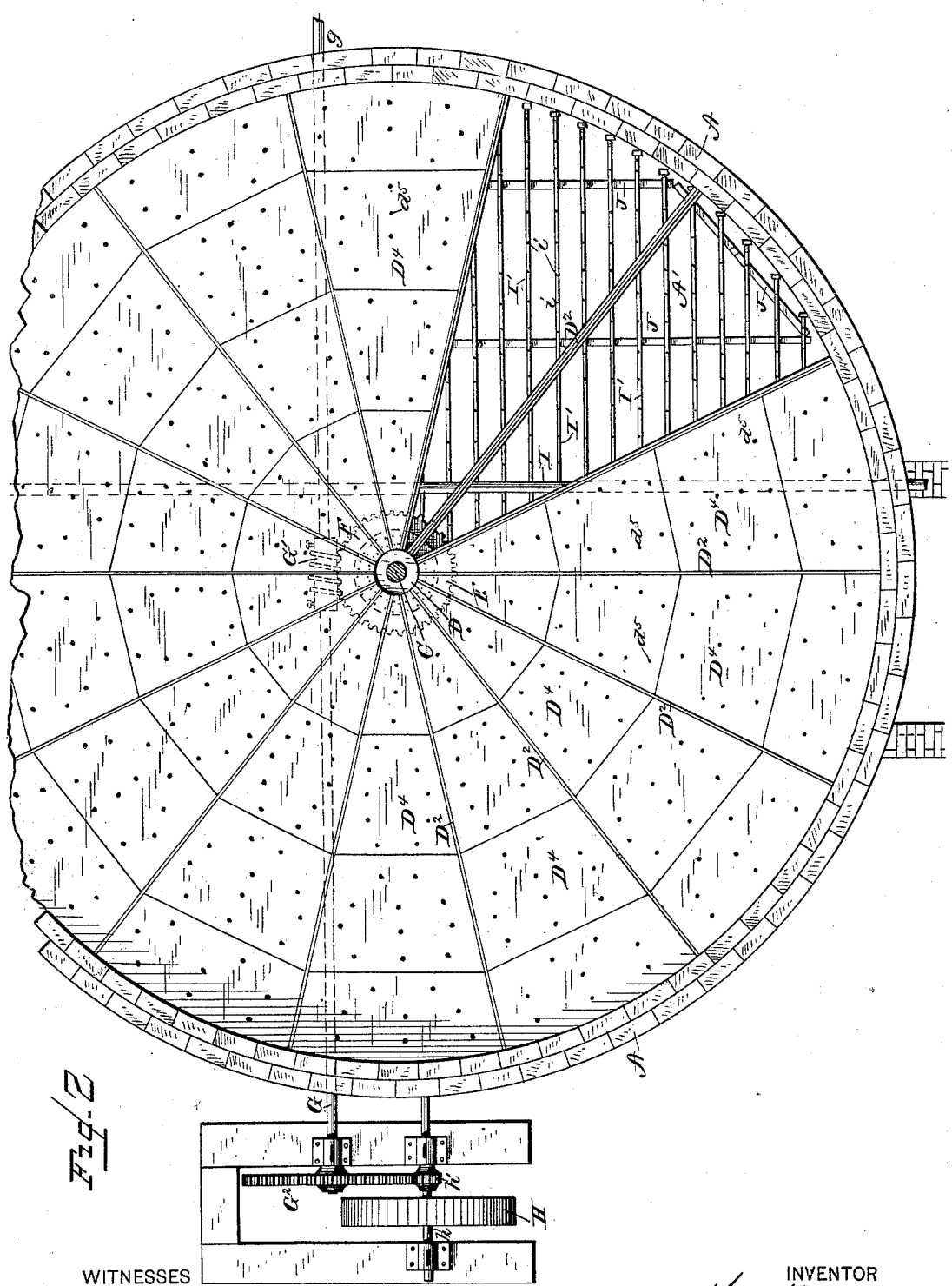
WITNESSES
INVENTOR
Wm Falconer
by A. L. Smith,
ATTORNEY.

(No Model.) 3 Sheets—Sheet 3.
W. FALCONER.
MACHINE FOR THE MANUFACTURE OF CARBON BLACK.
No. 277,472. Patented May 15, 1883.
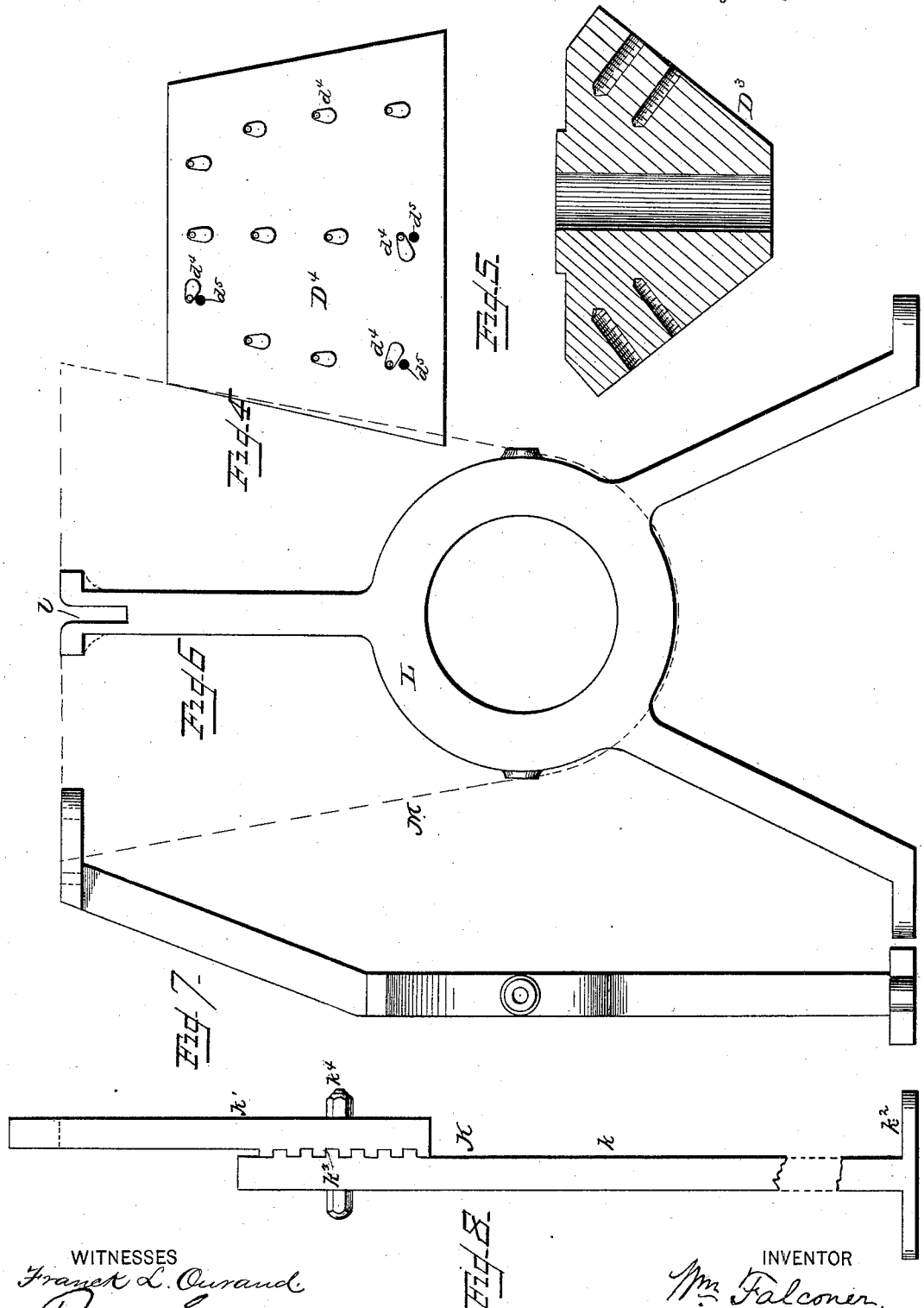
WITNESSES
INVENTOR
ATTORNEY

UNITED STATES PATENT OFFICE.

WILLIAM FALCONER, OF FOSTER'S MILLS, PENNSYLVANIA.

MACHINE FOR THE MANUFACTURE OF CARBON-BLACK.

SPECIFICATION forming part of Letters Patent No. 277,472, dated May 15, 1883.

Application filed March 13, 1883. (No model.)

*To all whom it may concern:*

Be it known that I, WILLIAM FALCONER, a subject of the Queen of Great Britain, and a resident of Foster's Mills, county of Armstrong, State of Pennsylvania, have invented a new and useful Improvement in Machines for the Manufacture of Carbon-Black, of which the following is a full, clear, and exact description, reference being had to the accompanying drawings, making part of this specification.

My invention relates to that class of machines employing stationary jets or burners in connection with a moving surface upon which the carbon-black is deposited; and it consists in a novel construction of turn-table located and rotating above stationary jets or burners, and having ventilating-apertures for the escape of heated air; in a novel means for supporting and actuating said table; in the combination, with the moving table, of a stationary scraper composed of a series of overlapping sections and a screw-conveyer, or its equivalent, the former for removing the black from the moving lower surface of the table and depositing it in a suitable trough or receptacle and the latter for taking the black from said trough and conveying it to the desired point of deposit; in the combination, with the ventilating-plates of the moving table, of means for adjusting the ventilation as desired; in the means for adjusting the jets or burners, whereby they can be set nearer to or farther from the moving table, and in certain details of construction and arrangement, hereinafter explained.

In the accompanying drawings, Figure 1 represents a vertical section through a machine or apparatus for manufacturing carbon embracing my improvements. Fig. 2 is a plan or top view of the same, with some of the plates of the revolving table removed to show the arrangement of parts underneath the table. Fig. 3 is a perspective view of one of the stationary scrapers and its supporting-rod. Fig. 4 shows one of the ventilating-plates of the turn-table detached. Fig. 5 represents the cap of the vertical shaft of the turn-table in section. Figs. 6 and 7 are side and edge elevations of the inner standard supporting the scrapers and receptacle, and in which the shaft of the screw-conveyer has its bearing at its inner end; and Fig. 8 is a side elevation of one of the legs or supports for the bars on which the gas-pipes rest.

A represents an upright annular wall forming a circular chamber, A', centrally of which, upon a suitable foundation, B, is secured a plate, B', in which the lower end of an upright shaft, C, is stepped in any suitable manner, the upper end of this shaft being journaled in a block, C', as will be hereinafter explained.

Upon the shaft C is secured a hub, D, provided on its upper end with a circular flange, D', having radial sockets or recesses in its upper face, in which are secured a series of radial arms or spokes, $D^2$, made of T-rails, (inverted,) and supported at their outer ends, and also at suitable intermediate point or points, if required, by stay or brace rods $d$ and $d'$, extending obliquely inward and upward therefrom to a cap, $D^3$, secured to the upper end of the shaft C, and resting on a collar or shoulder, $c$, formed thereon. These stay-rods are formed in two (or more) parts, one of which is secured to the radial arms $D^2$ in any suitable manner and the other is provided with a screw-thread, screwing into a threaded socket in the cap $D^3$, the two parts being connected at their adjacent ends by a swivel-nut, $d^3$, by means of which said stay-rods or braces can be adjusted in length for leveling up and preventing sagging of the arms $D^2$. Upon the horizontal flanges on the lower sides or edges of these T rails or arms $D^2$ are placed the flooring-plates $D^4$, made tapering inward to conform to the converging of the arms toward the central hub, and provided with a rabbet on their lower faces, at their edges, where they rest on the flanges of the T rails or arms $D^2$ in such manner as to bring their lower faces flush with the lower faces of said rails, thereby giving the lower collecting-face of the table, formed by said rails and plates, a smooth level surface. The table thus formed rests within the circular chamber A', forming a cover thereto, and fitting as closely to the wall A as practicable without interfering with its free and easy rotation within the same. The cap $D^2$, to which the upper ends of the stay-rods $d$ and $d'$ are secured, by preference is made in the form substantially of a frustum of a cone inverted, with the angle at its base cut away, as shown, and upon the shaft C, above this cap, and resting upon it, is the block or sleeve C′, in which the upper end of the shaft C is journaled, said block being connected by stay-rods c′ with anchors c², secured at suitable points outside the wall A. These stay-rods are jointed, like d and d′, and are provided with adjusting-swivels c³, by means of which they may be adjusted in length as may be necessary for keeping the shaft C in a vertical position.

The shaft C, near its lower end and underneath the table described, has a worm-wheel, F, keyed to it, with which a worm or screw, G′, on a horizontal shaft, G, engages for driving the shaft C and imparting a rotary movement to the table. The outer end of this shaft, extending beyond the wall A, is provided with a spur-gear, G², engaging with and actuated from a pinion, h′, on a short shaft, h, and which is shown provided with a band-wheel, H, to which motion is imparted from any suitable power; but any suitable arrangement of mechanism may be employed for driving the shaft C. The shaft G is shown extended at g, (and broken away,) on the side opposite that with which the power is connected, to indicate that the same shaft may be extended for actuating a series of rotating tables, placed side by side, if desired. Underneath the rotating table are placed jets or gas-burners i, connected with a series of small parallel horizontal pipes, I′, all of which connect with a main or service pipe, I, through which the gas is supplied to said burners, the latter being arranged in close proximity with the lower face of the revolving table. These pipes I′ rest and are supported on a series of horizontal bars, J, arranged at right angles to said pipes, and which by preference are made in the form of T-rails, the standard or upright portion of which rests in open slots or notches formed in the upper ends of supporting standards or legs K, (see Fig. 8,) the form of the extreme upper ends of said standards, and of the slot therein, being similar to that shown at l in Fig. 6. The standards or legs K are made in two parts, k and k′, the former provided with a flange or foot, k², resting upon and secured to any suitable foundation, and one or both are provided with slots at their adjoining and overlapping ends, and on their adjacent faces with intermeshing teeth k³, and the two parts are connected by a through-bolt, k⁴, by loosening which the said standards can be adjusted in length for raising or lowering the bars or rails J and the pipes I for setting the burners nearer to or farther from the table, as desired. Any other suitable construction may be employed for effecting the adjustment of the burners, or, if preferred, the table may be adjusted instead of the burners.

M represents a trough or receptacle for catching the black as it is scraped from the lower surface of the table, said receptacle extending radially from near the shaft C, at its inner end, outward through an opening in the wall, and by preference V or U shaped in cross-section, with flaring sides, which extend up into close proximity with the lower surface of the revolving table, and rounded or concave in its lower part to conform closely to an endless screw-conveyer, N, rotating therein. The shaft of this screw-conveyer is mounted at its inner end in the angular standard L, the form of which (shown in Figs. 6) and 7 is such as to stand clear of the worm-wheel F, supported on the central foundation-wall, B, its upper end being bent inward and overhanging said wheel in such manner as to bring it near the hub D of the circular table, said standard forming also the support for the inner end of the receptacle M. The outer end of the screw-conveyer shaft has its bearing in the outer end wall, m, of the trough M, or in any other suitable support. To the extreme inner end of the shaft of the screw-conveyer is secured a beveled pinion, n, which engages with a beveled annular gear formed on the upper face of the worm-wheel F, through which motion is imparted to the table D² D³, the same wheel being thus made to actuate the conveyer.

In the upper end of the standard L is secured, in any suitable manner, the inner end of a rod, p, which extends lengthwise of the trough or receptacle M, about centrally of its width, the outer end of said rod being secured in a suitable bracket attached to the wall A or other suitable point of support. If preferred, this rod, which forms the pivotal support for the divided or sectional scraper hereinafter described, may be composed of a number of short rods supported in suitable brackets or arms attached to the trough M, instead of being made in a single long rod extending from end to end of said trough; or where the long single rod is used intermediate supports may be employed to prevent its sagging with the weights of the scrapers. The stationary scraper is composed of a number of short obliquely-placed and overlapping sections, s, of the form indicated in Fig. 3, each section s being formed upon or secured to the upper short arm of a weighted bar, S. These bars are strung closely together on the rod or rods p, and their weighted lower ends serve to hold the scrapers s up snugly against the lower face of the revolving table. These scrapers or sections s are of a length somewhat greater than the width of the bars S, and are set obliquely on the upper ends of the latter, and in such manner that their ends overlap each the ends of the adjoining scraper-section, thereby insuring the thorough scraping of the entire lower face of the table, while by the construction described each section is adapted to yield independently of the others to any little inequalities in its path on the face of said table. By preference, also, the scraper-sections are connected with the upper ends of the weighted bars by a single horizontal pivot, s′, which allows them to vibrate relatively to the supporting-bars in conforming to the surface of the table moving over them.

The removable sections or plates D⁴ of the table are provided with small valves d⁴, (see Fig. 4,) by the adjustment of which the ventilation through said plates can be regulated at will by setting said valves so as to partly close more or less the ventilating-openings $d^5$ through said plates. Air is admitted to the chamber A' through suitable openings in the wall A, which may also be supplied with valves for regulating the supply of air for promoting combustion.

The operation will be readily understood without further description.

The machine or apparatus described is particularly designed for utilizing the gas from the gas-wells of the oil regions, and which, but for some apparatus for the purpose, would to a very great extent be wasted; but it will be apparent that its use is not necessarily confined to such localities, and that it may be employed to advantage wherever such an apparatus is required.

Having now described my invention, what I claim as new is—

1. In a machine for the manufacture of carbon-black, the combination, with the stationary burners, of the perforated horizontally-rotating table, arranged and operating substantially as described.

2. The rotating table composed of the central hub or shaft, the radial arms, the removable ventilating-plates applied to said arms, the adjusting stay-rods for supporting and adjusting the outer ends of said arms, and the rotating cap to which said stay-rods are connected, all substantially as and for the purpose described.

3. The combination, with the rotating table, of the stationary scraper, the trough or receptacle for the carbon-black, and the endless conveyer for removing the black from said receptacle, substantially as described.

4. The combination, with the stationary burners, of the rotating horizontal table, the stationary sectional scraper, the trough or receptacle for receiving the black, and the conveyer for removing the black from said receptacle, substantially as described.

5. The perforated ventilating-plates of the rotating table, in combination with valves for regulating the ventilation through said plates, substantially as described.

6. The combination, with the moving table on which the black is deposited, of the stationary scraper, composed of short obliquely-placed overlapping and independently-pivoted sections, substantially as and for the purpose described.

7. The scraper composed of short sections, in combination with the pivoted and weighted arms supporting said sections, substantially as described.

8. The combination, with the rotating table, of the stationary burners, and means for adjusting said burners nearer to or farther from said table, substantially as described.

9. The combination, in a machine for making carbon-black, of the vertical shaft of the rotating table, and the sleeve or block in which the upper end of said shaft has its bearing, said block being secured in place by means of jointed stay-rods, permitting the adjustment of said shaft, substantially as described.

10. The combination, in a machine for the manufacture of carbon-black, of stationary burners, a table moving over said burners, a stationary scraper for removing the black from said table, a stationary trough or receptacle arranged underneath said scraper, and means for removing the black from said receptacle, actuated by the same mechanism which actuates the moving table, substantially as described.

In testimony whereof I have hereunto set my hand this 9th day of March, A. D. 1883.

WM. FALCONER.

Witnesses:
H. B. ZEVELY,
REX. SMITH.